United States Patent [19]

Ricks

[11] 4,291,672
[45] Sep. 29, 1981

[54] FLOATABLE SOLAR HEAT MODULES

[76] Inventor: Jay W. Ricks, 4121 Cambridge Dr., Bakersfield, Calif. 93306

[21] Appl. No.: 160,010

[22] Filed: Jun. 16, 1980

[51] Int. Cl.³ .............................................. F24J 3/02
[52] U.S. Cl. ..................................... 126/415; 126/451
[58] Field of Search ............... 126/416, 417, 451, 432, 126/438

[56] References Cited

U.S. PATENT DOCUMENTS

| 3,998,204 | 12/1976 | Fuchs | 126/415 |
| 4,108,156 | 8/1978 | Sitter | 126/415 |

FOREIGN PATENT DOCUMENTS

| 2315067 | 2/1977 | France | 126/415 |
| 52-8540 | 1/1977 | Japan | 126/415 |

Primary Examiner—Samuel Scott
Assistant Examiner—G. Anderson
Attorney, Agent, or Firm—Harvey B. Jacobson

[57] ABSTRACT

A floating solar heat module for swimming pools comprises a solid surface for conducting heat from the sun's rays to the water and further includes a solid heat storage member for continual heating even during the night. A float is included to maintain the solar heat module on the surface of the pool. The solid heat storage medium is a rolled metal disk which is sandwiched between top and bottom heat conducting plates, the top plate receiving the heat of the sun's rays through a transparent top panel and the bottom plate transferring the heat conducted through the top plate and rolled disk to the water.

5 Claims, 5 Drawing Figures

FLOATABLE SOLAR HEAT MODULES

BACKGROUND OF THE INVENTION

Field of the Invention

This invention relates to solar heaters and more particularly to a novel solar heat module intended to be floated on a body of water whereby the water may be heated via the rays of the sun.

Disclosure Statement

To secure maximum enjoyment of the average home swimming pool, especially throughout the spring and fall seasons, some form of heater for the pool water is needed to maintain a comfortable water temperature. Even in warm air climates where the sun heats the water to its desirable temperature during the daytime, the water cools during the night to an undesirable temperature when the ambient temperature drops. Thus, conventional heating equipment is required to constantly maintain a comfortable water temperature if there is to be optimum use of the pool. In view of the increased cost of fuels, such as gas or oil to fire the heaters, maintaining a comfortable water temperature is now quite expensive.

Various attempts have been made to employ solar heating for raising and maintaining pool water at a comfortable swimming temperature. Examples of using solar heat have included the employment of coils of pipe or tubing exposed on the roof of a building and connected to the pool circulating water supply. Some heat is, in fact, captured by this technique. However, such a system requires power to pump pool water through the pipes and then back into the pool, further adding to operating costs.

Other attempts to maintain a comfortable swimming temperature have included the use of flexible covers pulled over the pool, the covers being of various heat absorbing materials. These also have their limitations in that such material normally has a specific gravity greater than water and will sink below the surface unless adequate means are provided to support it at the sides and ends. Usually this also means that such a cover must extend entirely over the pool when in use and, consequently, may become cumbersome to remove when the pool is to be used and to replace after swimming activities cease.

More recently, solar heating has been accomplished by utilizing individual floating units which are inserted on the water surface and which conduct the impinging solar radiation to the water surface and insulate the pool at night. Such devices are disclosed in U.S. Pat. Nos. 4,022,187, 3,984,882, 3,984,881 and 3,893,443. These patented devices involve either the use of a single layer material enclosed within a frame, the material conducting the heat from the sun to the surface waters which are in contact or near the solar energy absorbing material, or a double layer device which captures the heat of the sun with air entrapped between the double layers, the layers being formed of plastic or metal, the devices of either form covering some or all of the surface of the water in the pool. None of the above cited patents, however, are able to store enough heat to maintain a comfortable water temperature when the ambient temperature drops for short periods of time, such as during the night. Accordingly, a large number of the individual solar heaters are needed to increase the water temperature which invariably hinders any swimming activity and, in fact, one patentee prefers to cover the entire surface of the pool with the heating units when the pool is not in use. A need, therefore, exists to provide a heating unit for pool water which does not require the need of expensive fossil fuels for operation and which can utilize solar radiation to heat and maintain the pool water at a comfortable swimming temperature even if the ambient temperature drops for short periods of time.

SUMMARY OF THE INVENTION

The present invention provides a novel solar heating apparatus for maintaining a heated water temperature for a large body of water, such as a home swimming pool by providing a plurality of solar heating modules which absorb solar radiation in the form of heat and transfer the heat to the water. Each solar heat module comprises top and bottom heat conducting panels and a solid heat storage means placed between and in heat conducting contact with the two panels. Placed above and spaced from the top panel is a transparent glass sheet which enables the rays from the sun to pass therethrough and contact the air space above the top panel. The air and the top panel transfer the captured heat to the heat storage means and then to the bottom panel for conduction to the water. Excess heat stored in the solid heat storage means is continuously transferred to the bottom plate and to the water, even during the night. In one form of the invention, the glass panel may include a magnifying means to concentrate the sun's rays.

Accordingly, it is an object of the present invention to provide a novel solar heating apparatus for maintaining the heated temperature of a large body of water.

Another object of the present invention is to provide an improved solar heating module for a swimming pool which floats upon the water surface when in use and which is easy to remove from the pool.

Still another object of the present invention is to provide a novel solar heating module for maintaining pool water temperature which is sufficiently effective in capturing the heat of the sun and transferring the heat to the water beneath.

Still yet another object of the present invention is to provide a solar heating module for maintaining pool water at a comfortable temperature for use which is sufficiently effective in capturing the heat of the sun and transferring the heat to the water beneath and maintain the comfortable water temperature during short periods of cool temperatures.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
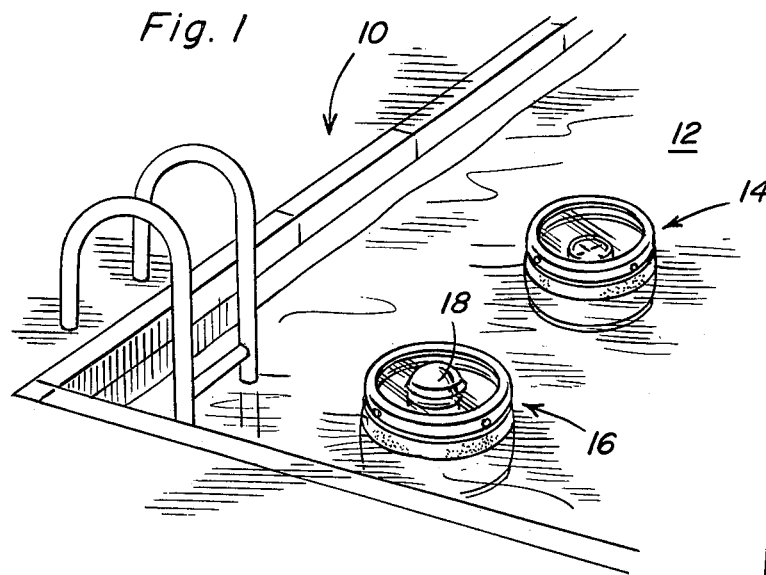
FIG. 1 is a perspective view of a swimming pool incorporating the novel solar heating modules of the present invention, two forms of the invention being shown.

The solar heating modules of the present invention have particular use in heating and maintaining pool water at a comfortable swimming temperature. Referring to FIG. 1, pool 10 filled with water 12 contains the solar heating modules manufactured according to the teachings of the present invention. Preferably, a plurality of the solar heating modules are utilized to heat and maintain a comfortable water temperature. Shown in FIG. 1 is solar heat module 14 and solar heat module 16 containing magnifying lens 18. Either, or both kinds of solar heat modules 14 and 16 may be used to heat the pool water.

Figure 2:
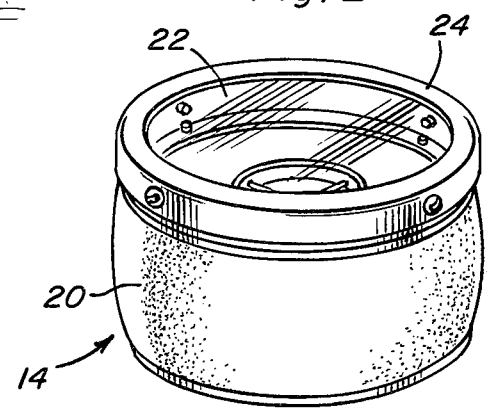
FIG. 2 is an enlarged perspective view of one form of solar heat module of the present invention.

In FIG. 2 is shown solar heat module 14 which includes float 20 to maintain the sun receiving surface of the module above the surface of the water as shown in FIG. 1. Solar heat module 14 includes transparent glass plate 22 which transmits the rays of the sun therethrough to the heat conducting and transfer surfaces below which are primarily situated below the surface of the water and which conduct the heat captured from the sun's rays to the water. Glass plate 22 is securely fastened to solar heat module 14 by means of security ring 24.

Figure 3:
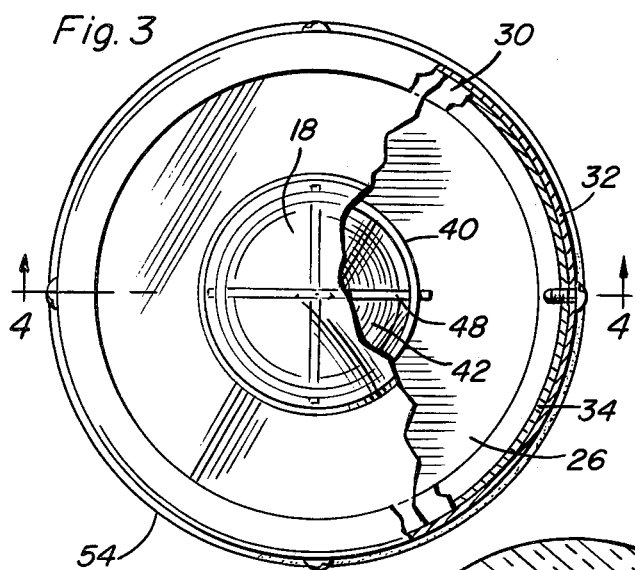
FIG. 3 is an enlarged plan view, partially broken away and sectioned, of one of the solar heating modules.
Figure 5:
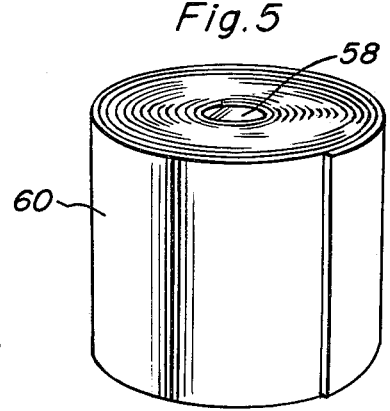
FIG. 5 is a perspective view illustrating the solid heat storage means which is incorporated in the solar heat module of the present invention.
Figure 4:
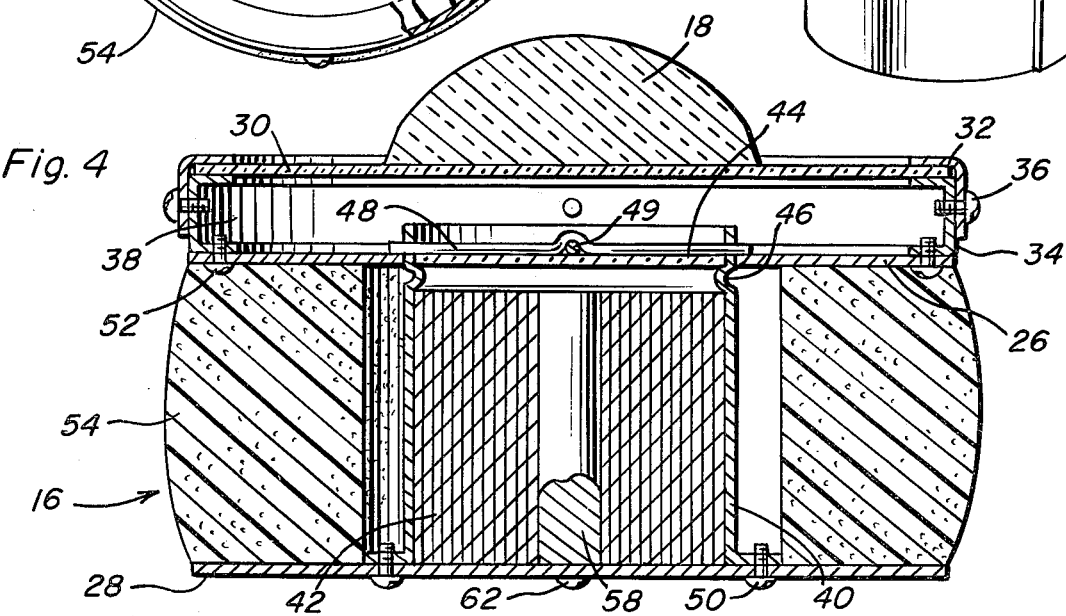
FIG. 4 is a transverse sectional view of one form of the solar heating module taken generally along line 4—4 of FIG. 3.

Illustrated in FIGS. 3 and 4 are the details of construction of solar heat module 16. It is noted, however, that except for magnifying lens 18, the details of construction of solar heat module 16 is equivalent to that of solar heat module 14. Solar heat module 16 is preferably cylindrical in shape, although other shapes can be utilized with equivalent results, and includes top heat conducting panel 26 formed in the shape of a ring defining the outer circumference of the module and heat transfer bottom panel 28 which conducts the heat captured by the sun to the pool water. Heat from the sun is captured through light transmitting magnifying lens 18 and transparent glass plate 30, lens 18 being fused, cemented, or otherwise attached to plate 30. Glass plate 30 is held in place by security ring 32 which maintains glass plate 30 firmly against spacer ring 34. Security ring 32 is secured to spacer 34 by means of bolts or screws 36. Spacer ring 34 provides an air space 38 between glass plate 30 and heat conducting panel 26, thus providing a heat insulating barrier between the heat conducting portion of solar heat module 16 and the atmosphere. Placed through top heat conducting ring 26 is spacer and storage element 40 which encloses heat storage means 42 and supports transparent plate 44 which permits the rays of the sun to pass from air space 38 to heat storage means 42. Transparent plate 44 is preferably formed of glass and is supported by bead 46 placed circumferentially around spacer and storage element 40. Placed on top of transparent plate 44 are cross bars 48 and 49 which hold transparent plate 44 firmly against bead 46, cross bars 48 and 49 being placed through apertures formed in spacer and storage element 40 for support. Heat captured by heat storage means 42 is conducted to bottom panel 28 which is secured to spacer and storage element 40 by means of bolts 50. Top heat conducting panel 26 is secured to spacer 34 by means of bolts 52, top heat conducting panel 26 being also supported on annular float 54 which is typically formed of foamed plastic materials that enable the solar heat module to float along the surface of pool water 12 as shown in FIG. 1.

Heat storage means 42 is in the form of a heat storage pack which includes a metal bar 58 around which is wound coil 60. Bar 58 is preferably formed of steel, coil 60 being formed of a wound sheet metal. Heat conducting metals such as tin, aluminum, copper, or any other metal of good heat storage and conducting properties can be used. Heat storage means 42 is encased in spacer and storage element 40, but can also be firmly secured to bottom panel 28 by means of bolt 62 as shown in FIG. 4.

In operation, one or more of solar heat modules 14 or 16 are placed in the pool and float on the surface of the water so that transparent plates 30 and 44 are above the water surface. Sun rays entering through plate 30 and in the case of solar heat module 16, concentrated through magnifying lens 18 will heat air space 38 and heat conducting panel 26. The entering rays will further pass through transparent plate 44 to heat storage means 42. The heat captured by air space 38, panel 26 and heat storage means 42 will be conducted to bottom panel 28 and then to the water in the pool. The solar heat modules 14 and 16 are such that heat captured by heat storage means 42 will be in excess of the heat transferred by bottom panel 28 to the water causing heat to build up in heat storage means 42 providing temperatures up to about 120°–140° F. This heat build up enables the continuous heating of the pool water during short periods of cool weather such as during the night, as the stored heat is transferred to bottom panel 28 and to the contacting water. The solid heat storage means 42 of the present invention is a vast improvement over prior art solar heaters which utilize a single layer heat collector and conducting means or heated air to collect, store, and transfer heat. The relatively small size of solar heat modules 14 and 16 enable their use even during swimming activities in pool 10, where they would be moved around the surface area of the pool to provide uniform heating.

While the materials of construction of the solar heat modules are not critical, such materials should be light enough so that the modules will float when provided with float 54 of comparatively small size. Preferably, securing ring 32, spacer 34, spacer and storage element 40, top heat conducting panel 26 and bottom panel 28 are formed of thin sheet metal, such as iron, tin, or aluminum. While transparent plates 30 and 44 are preferably made of glass, plastic materials which have good light and heat transmitting properties can be utilized. The color of the heat conducting panels and the heat storage means can be such to provide added heat absorption.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A floatable solar heating module for use in heating bodies of water comprising; a heat conducting plate for transferring heat to the water, a solid heat storage means in contact with said plate and a transparent plate spaced from said heat storage means to transmit solar radiation to said heat storage means, said heat storage means being enclosed within a storage container, said container supporting said transparent plate above said heat storage means, said container being in contact with a heat conducting panel, said heat conducting panel being spaced from said heat conducting plate and receiving solar radiation through said transparent plate, said heat storage means positioned so as to receive conduction heat from said heat conducting panel and conduct a portion of said heat to said heat conducting plate, said module including a float positioned so as to surround said container.

2. The solar heat module of claim 1 wherein said heat conducting means is a metal plate and said heat storage means is a coiled metal sheet.

3. The solar heat module of claim 2 wherein said solar radiation transmitting means is a transparent glass plate.

4. The solar heat module of claim 3 wherein said transmitting means includes two spaced glass plates, an upper and lower plate which form an insulating air space therebetween above said heat storage means.

5. The solar heat module of claim 4 further including a magnifying lens placed on top of said upper glass plate.

* * * * *